(12) United States Patent
Yamato (10) Patent No.: US 11,554,856 B2
(45) Date of Patent: Jan. 17, 2023

(54) UNMANNED AERIAL VEHICLE (71) Applicant: RAKUTEN GROUP, INC., Tokyo (JP)

(72) Inventor: Takumi Yamato, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 368 days.

(21) Appl. No.: 16/759,353

(22) PCT Filed: Dec. 27, 2018

(86) PCT No.: PCT/JP2018/048145
§ 371 (c)(1),
(2) Date: Apr. 26, 2020

(87) PCT Pub. No.: WO2020/136803
PCT Pub. Date: Jul. 2, 2020

(65) Prior Publication Data
US 2021/0214075 A1    Jul. 15, 2021

(51) Int. Cl.
*B64C 27/08*    (2006.01)
*B64C 39/02*    (2006.01)
*B64C 27/16*    (2006.01)

(52) U.S. Cl.
CPC .............. *B64C 27/08* (2013.01); *B64C 27/16* (2013.01); *B64C 39/024* (2013.01); *B64C 2201/108* (2013.01)

(58) Field of Classification Search
CPC ....... B64C 27/08; B64C 27/16; B64C 39/024; B64C 2201/108
See application file for complete search history.

(56) References Cited

U.S. PATENT DOCUMENTS

| | | | |
|---|---|---|---|
| 9,550,561 B1 | 1/2017 | Beckman et al. | |
| 2016/0159471 A1* | 6/2016 | Chan | B64C 27/08 |
| | | | 244/39 |
| 2016/0159472 A1 | 6/2016 | Chan et al. | |
| 2016/0340028 A1* | 11/2016 | Datta | B64C 27/08 |

(Continued)

FOREIGN PATENT DOCUMENTS

| | | |
|---|---|---|
| JP | 2017196949 A | 11/2017 |
| KR | 101852844 B1 | 4/2018 |
| WO | 2020100820 A1 | 5/2020 |

OTHER PUBLICATIONS

Search Report dated Jun. 17, 2021, corresponding EP Patent Application No. 18934520.0, pp. 1-12.

*Primary Examiner* — Rodney A Bonnette
(74) *Attorney, Agent, or Firm* — HEA Law PLLC (57) ABSTRACT

Provided is an aerial vehicle, including: a package carrier including a plurality of vertical members being changeable in relative positions in a horizontal direction and surrounding a package in the horizontal direction to prevent falling of the package. A plurality of rotary wings are changeable in relative positions in the horizontal direction. The relative positions of the plurality of vertical members and the relative positions of the plurality of rotary wings are changeable. The package carrier is changed in shape in the horizontal direction in accordance with the relative positions of the plurality of vertical members. The change in the relative positions of the plurality of rotary wings is in conjunction with the shape of the package carrier.

15 Claims, 9 Drawing Sheets

(56) References Cited

U.S. PATENT DOCUMENTS

2017/0313421 A1   11/2017  Gil
2018/0105063 A1*  4/2018  Wei .................... B60L 50/66
2020/0031473 A1*  1/2020  Martens ............... B64D 1/22

* cited by examiner

UNMANNED AERIAL VEHICLE

CROSS REFERENCE TO RELATED APPLICATIONS

This application is a National Stage of International Application No. PCT/JP2018/048145 filed on Dec. 27, 2018. The contents of the above document is incorporated herein by reference in its entirety.

TECHNICAL FIELD

The present invention relates to an unmanned aerial vehicle.

BACKGROUND ART

A drone includes a holding mechanism configured to hold a package, and is capable of dropping the package after landing. In order to stably convey a large package, it is preferred that rotary wings be increased in size or that a plurality of rotary wings be significantly separated apart from each other in a horizontal direction, with the result that the drone is increased in size.

CITATION LIST

Patent Literature

[Patent Literature 1] JP 2017-196949 A

SUMMARY OF INVENTION

Technical Problem

A large drone is excellent in stability of flying. However, the large drone cannot easily turn in a compact space and requires a larger space for flying or takeoff and landing, that is, has low maneuverability. Therefore, the large drone is not suitable for conveyance of a small package.

The present invention has an object to achieve both stability and maneuverability of flying.

Solution to Problem (1) According to one embodiment of the present invention, there is provided an unmanned aerial vehicle, including: a package carrier including a plurality of vertical members, the plurality of vertical members being changeable in relative positions in a horizontal direction and surrounding a package in the horizontal direction to prevent falling of the package; and a plurality of rotary wings which are changeable in relative positions in the horizontal direction, in which the relative positions of the plurality of vertical members and the relative positions of the plurality of rotary wings are changeable, the package carrier is changed in shape in the horizontal direction in accordance with the relative positions of the plurality of vertical members, and the change in the relative positions of the plurality of rotary wings is in conjunction with the shape of the package carrier.

According to the present invention, the change in relative positions of the plurality of rotary wings is in conjunction with the shape of the package carrier, thereby being capable of achieving both stability and maneuverability of flying.

(2) The unmanned aerial vehicle according to Item (1) may further include an actuator configured to change the relative positions of the plurality of vertical members and the relative positions of the plurality of rotary wings.

(3) The unmanned aerial vehicle according to Item (2) may further include a plurality of arms moved by the actuator, in which the plurality of vertical members may each be held by a corresponding one of the plurality of arms, and the plurality of rotary wings may each be held by a corresponding one of the plurality of arms.

(4) In the unmanned aerial vehicle according to Item (3), the plurality of arms may each be configured to hold both at least a corresponding one of the plurality of vertical members and at least a corresponding one of the plurality of rotary wings.

(5) In the unmanned aerial vehicle according to Item (4), the plurality of arms may extend in the horizontal direction and be extendable and contractible, and the actuator may be configured to extend and contract the plurality of arms.

(6) In the unmanned aerial vehicle according to Item (3), the plurality of arms may include: a first group of arms configured to hold the plurality of vertical members; and a second group of arms configured to hold the plurality of rotary wings, and the actuator may include: a first actuator configured to move the first group of arms; and a second actuator configured to move the second group of arms.

(7) In the unmanned aerial vehicle according to Item (6), the second group of arms may each vertically overlap with a corresponding one of the first group of arms and extend in the same direction.

(8) In the unmanned aerial vehicle according to Item (6), the second group of arms may extend in directions different from those of the first group of arms.

(9) In the unmanned aerial vehicle according to any one of Items (6) to (8), the plurality of vertical members may be changeable so that a maximum inscribed rectangle thereamong is formed into a similar shape or a non-similar shape.

(10) In the unmanned aerial vehicle according to Item (9), the plurality of rotary wings may include: a first pair of rotary wings which are adjacent to each other along a first direction; and a second pair of rotary wings which are adjacent to each other along a second direction orthogonal to the first direction, and when the rectangle is formed into a rectangle elongated in the first direction, a clearance of the first pair of rotary wings may be set larger than a clearance of the second pair of rotary wings.

(11) In the unmanned aerial vehicle according to any one of Items (6) to (10), a change amount of the relative positions of the plurality of rotary wings may be proportional to a change amount of the relative positions of the plurality of vertical members.

(12) In the unmanned aerial vehicle according to any one of Items (6) to (10), the plurality of rotary wings may be arranged on an outer side from the shape of the package carrier by a distance, and a size of the distance may be proportional to a size of the shape of the package carrier.

(13) In the unmanned aerial vehicle according to any one of Items (6) to (13), the first group of arms may extend in the horizontal direction and be extendable and contractible, and the first actuator may be configured to extend and contract the first group of arms.

(14) In the unmanned aerial vehicle according to any one of Items (6) to (13), the second group of arms may extend in the horizontal direction and are extendable and contractible, and the second actuator may be configured to extend and contract the second group of arms.

(15) In the unmanned aerial vehicle according to any one of Items (6) to (13), the second actuator may be configured to swing each of the second group of arms at least at one position.

(16) In the unmanned aerial vehicle according to Item (15), the second actuator may be configured to swing each of the second group of arms in a horizontal direction.

(17) In the unmanned aerial vehicle according to Item (15), the second actuator may be configured to swing each of the second group of arms in a perpendicular direction.

DESCRIPTION OF EMBODIMENTS

Now, embodiments of the present invention are described with reference to the drawings. The present invention can be implemented by various modes without departing from the gist of the present invention, and is not to be construed as being limited to the contents of exemplary embodiments described below.

First Embodiment

Figure 1:
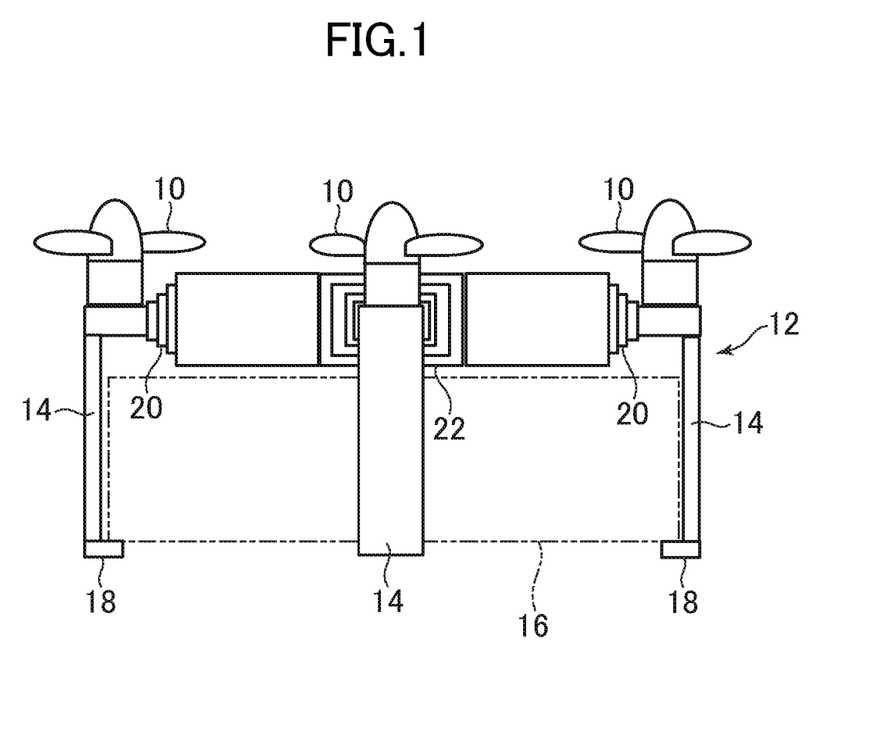
FIG. 1 is a side view for illustrating an unmanned aerial vehicle according to a first embodiment of the present invention.
Figure 2:
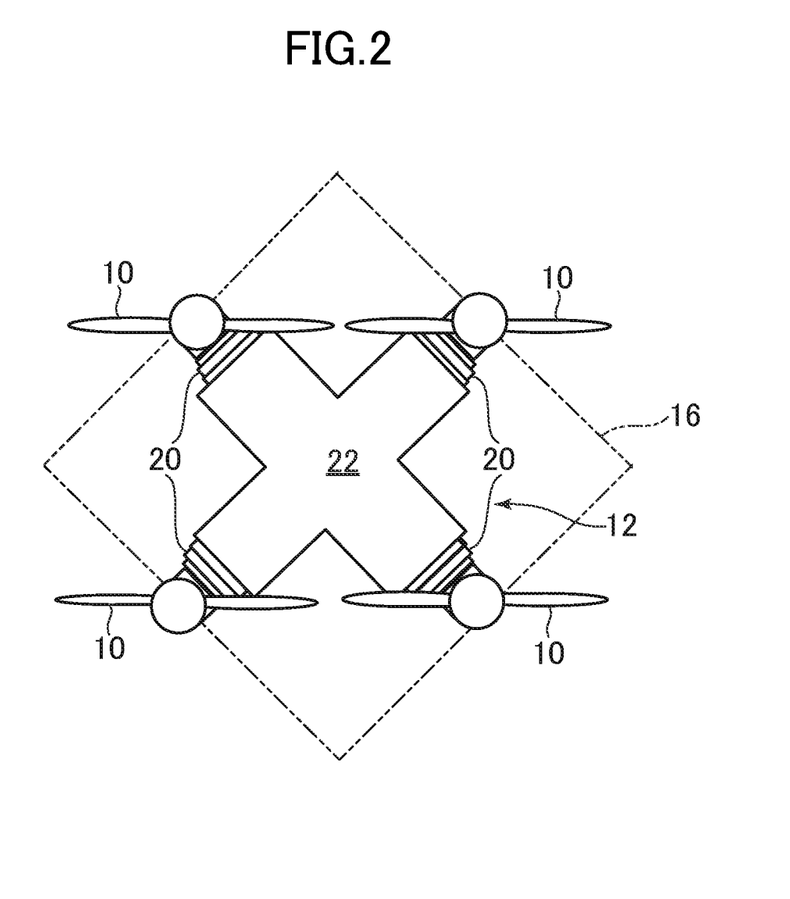
FIG. 2 is a plan view for illustrating the unmanned aerial vehicle illustrated in FIG. 1.

FIG. 1 is a side view for illustrating an unmanned aerial vehicle according to a first embodiment of the present invention. FIG. 2 is a plan view for illustrating the unmanned aerial vehicle illustrated in FIG. 1. The unmanned aerial vehicle is an aerial vehicle on which a person is not on board. For example, the unmanned aerial vehicle may be a drone driven by a battery or driven by an engine.

The unmanned aerial vehicle includes a plurality of rotary wings 10 (for example, propellers), which are configured to generate a downward airstream. The rotary wings 10 are driven by a motor and a battery (not shown). The unmanned aerial vehicle includes a control unit, a storage unit, a communication unit, and a sensor unit (not shown).

The unmanned aerial vehicle includes a package carrier 12. The package carrier 12 includes a plurality of vertical members 14. The plurality of vertical members 14 surround a package 16 in a horizontal direction so as to prevent falling of the package 16. A load of the package 16 is supported at a plurality of positions by a plurality of support members 18 (for example, arms or claws). The plurality of support members 18 are each fixed to a corresponding one of the plurality of vertical members 14. For example, the support members 18 extend from the vertical members 14 (for example, at lower ends thereof) in a direction toward the space surrounded by the plurality of vertical members 14. One pair of support members 18 extending in a direction of opposing each other is fixed to one pair of opposing vertical members 14. The one pair of opposing support members 18 are apart from each other. The vertical members 14 having the support members 18 fixed thereto are configured to support the load of the package 16. For example, the support members 18 support only end portions of the package 16.

The plurality of vertical members 14 are each held by a corresponding one of the plurality of arms 20. The plurality of vertical members 14 are each held by a corresponding one of the plurality of arms 20. The plurality of arms 20 are each configured to hold both at least a corresponding one of the plurality of vertical members 14 and at least a corresponding one of the plurality of rotary wings 10.

Figure 3:
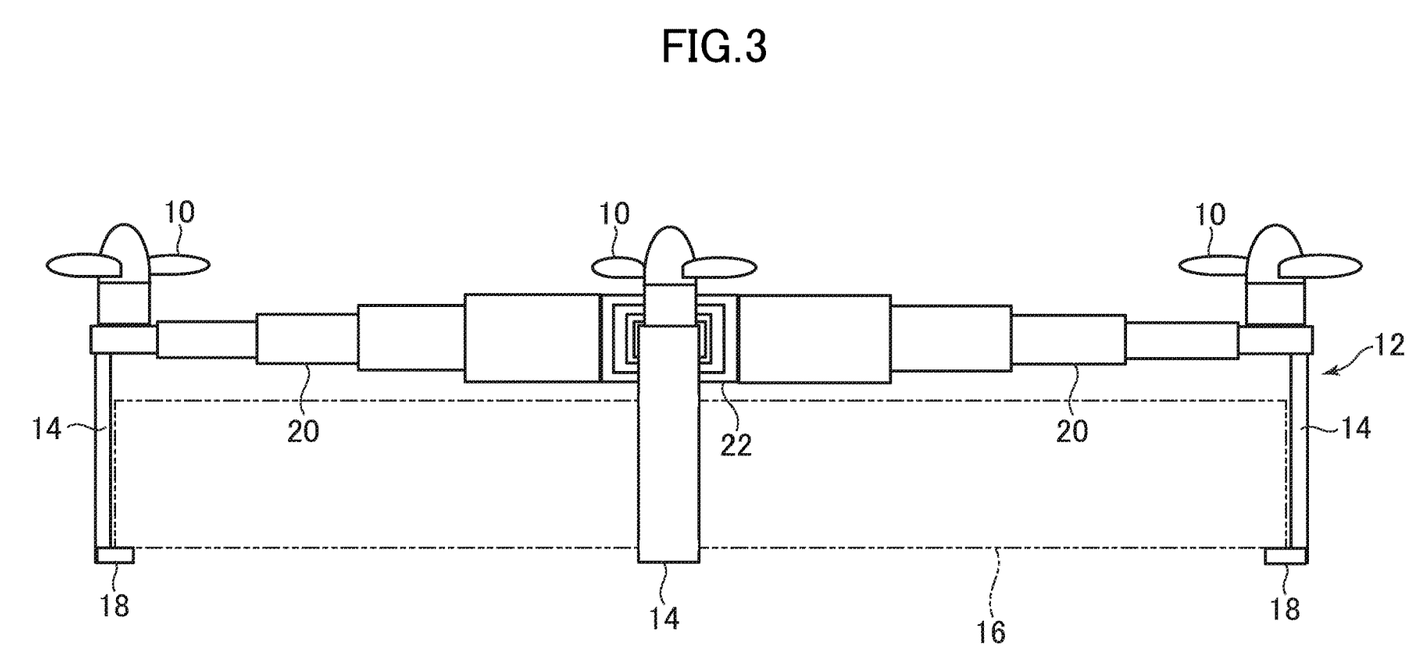
FIG. 3 is a side view for illustrating a state in which arms of the unmanned aerial vehicle illustrated in FIG. 1 are extended.
Figure 4:
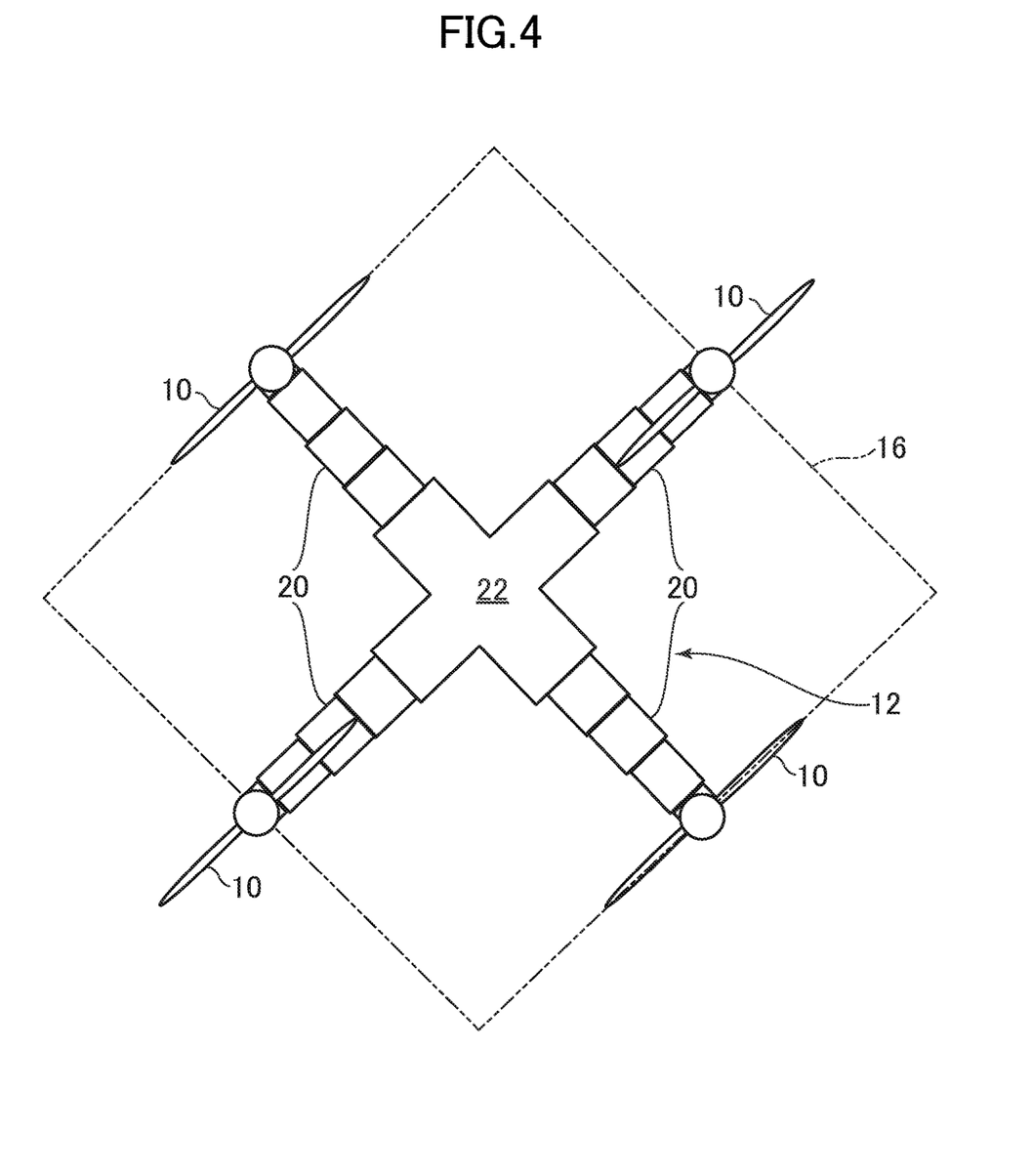
FIG. 4 is a plan view for illustrating the state in which the arms of the unmanned aerial vehicle illustrated in FIG. 2 are extended.

FIG. 3 is a side view for illustrating a state in which the arms 20 of the unmanned aerial vehicle illustrated in FIG. 1 are extended. FIG. 4 is a plan view for illustrating the state in which the arms 20 of the unmanned aerial vehicle illustrated in FIG. 2 are extended.

The plurality of arms 20 extend in the horizontal direction and are extendable and contractible. Thus, the plurality of rotary wings 10 are changeable in relative positions in the horizontal direction. Moreover, the package carrier 12 is changeable in relative positions in the horizontal direction. A length of each of the support members 18 in the horizontal direction is shorter than a length of horizontal movement of each of the vertical members 14. Through the horizontal movement of the vertical members 14 (separation of the opposing vertical members 14 from each other), the package 16 can be dropped off from the support members 18 (the package 16 supported by the support members 18 can be dropped).

The plurality of arms 20 are moved by the actuator 22. The actuator 22 is configured to extend and contract the plurality of arms 20. The plurality of rotary wings 10 can be changed in relative positions by the actuator 22. The plurality of vertical members 14 can be changed in relative positions by the actuator 22. The shape of the package carrier 12 is changed in accordance with the relative positions of the plurality of vertical members 14. The package carrier 12 is changed in shape in the horizontal direction.

The plurality of rotary wings 10 and the plurality of vertical members 14 are all mounted to the plurality of arms 20. Thus, a change in relative positions of the plurality of rotary wings 10 by the actuator 22 is in conjunction with a shape of the package carrier 12. A change amount of the relative positions of the plurality of rotary wings 10 is proportional to a change amount of the relative positions of the plurality of vertical members 14. With this, both the stability and maneuverability of flying can be achieved. For example, when a small package 16 is conveyed, a clearance among the plurality of rotary wings 10 becomes smaller. Thus, the size is reduced, and air resistance can be reduced. Meanwhile, when a large package 16 is conveyed, a clearance among the plurality of rotary wings 10 becomes larger. However, a posture during flying can easily be adjusted, and the air resistance may be reduced in some cases.

As a modification example of this embodiment, the actuator 22 may be omitted, and the relative positions of the vertical members 14 and the relative positions of the plurality of rotary wings 10 may be manually changed.

Second Embodiment

Figure 5:
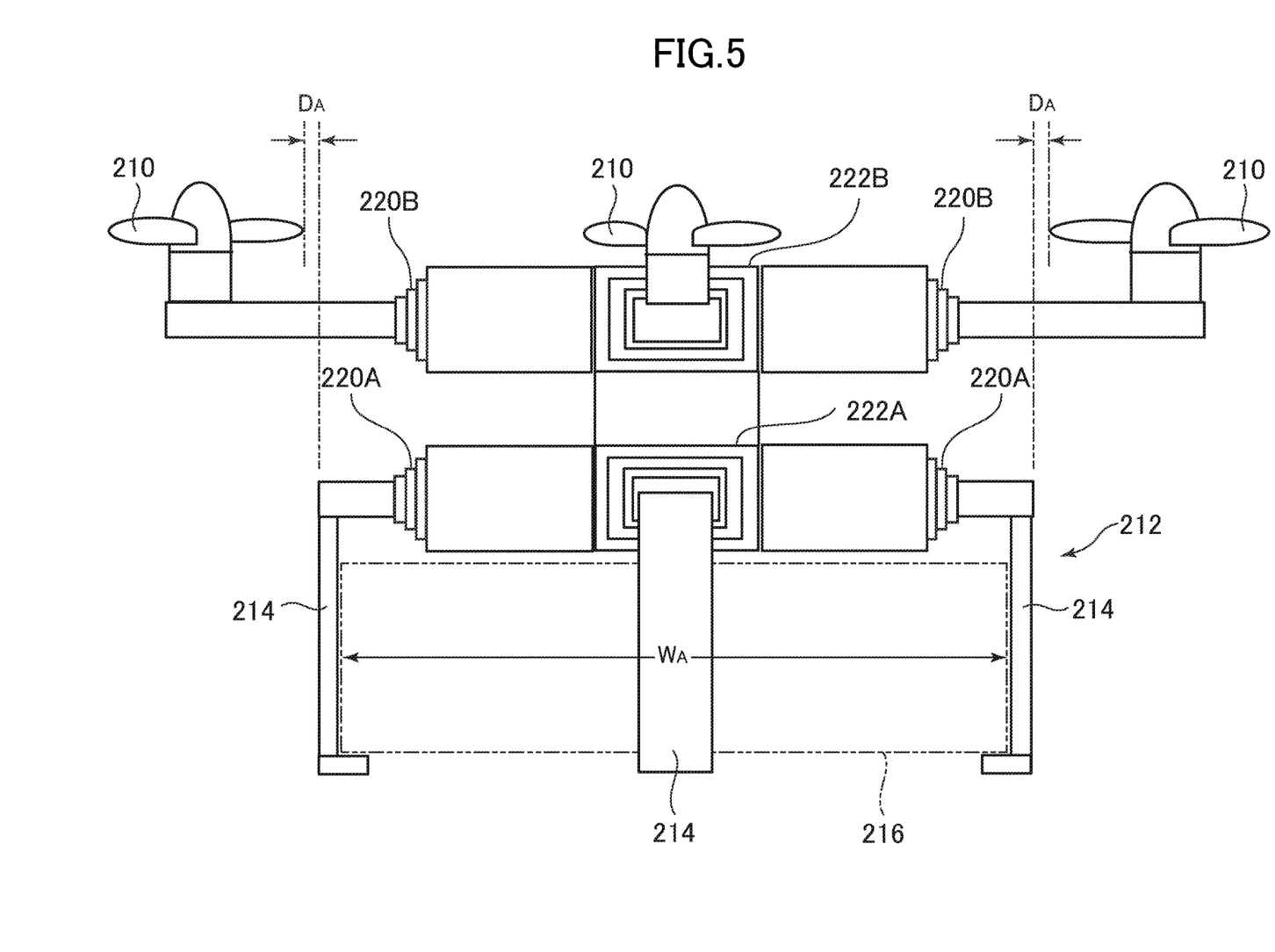
FIG. 5 is a side view for illustrating an unmanned aerial vehicle according to a second embodiment of the present invention.
Figure 6:
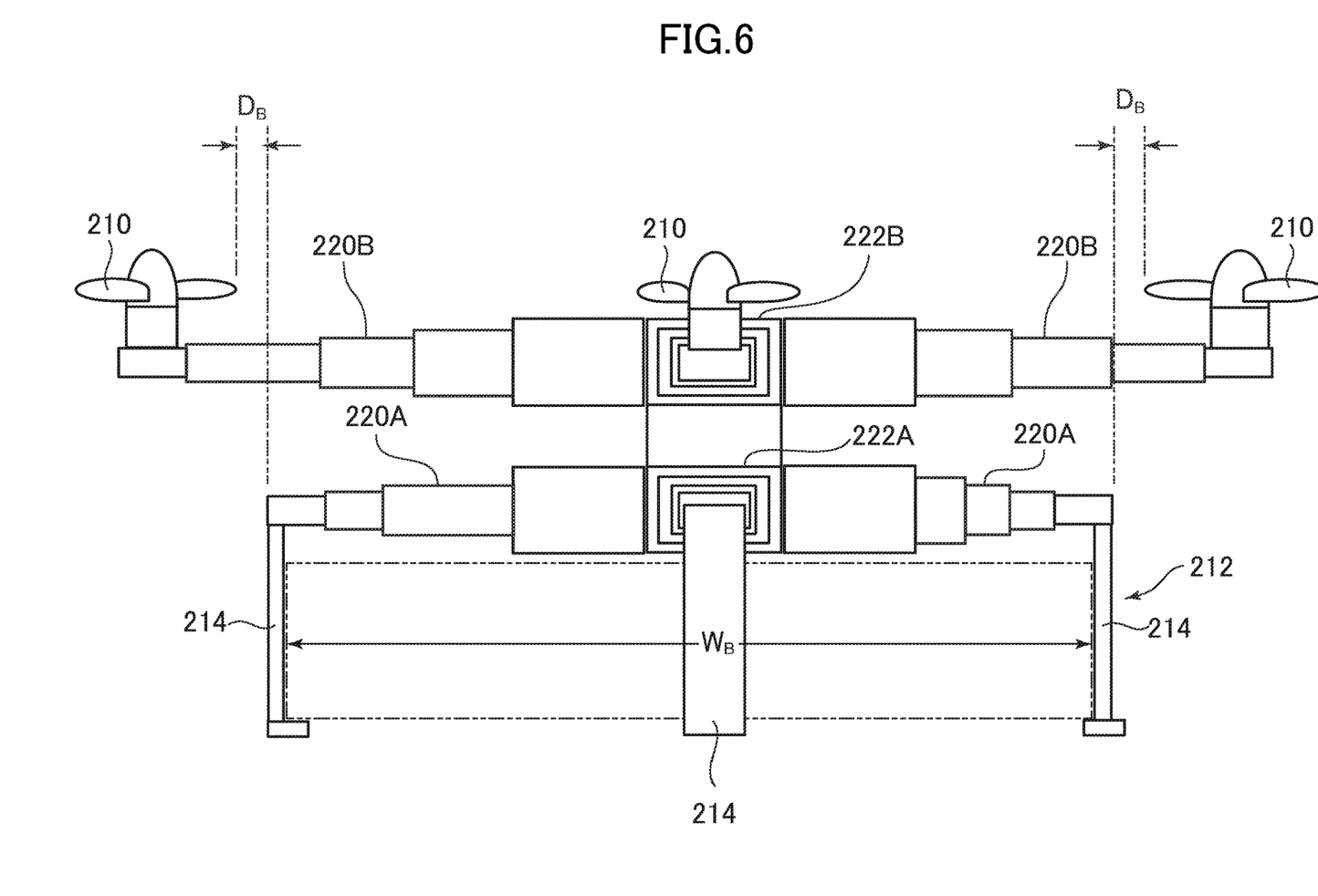
FIG. 6 is a side view for illustrating a state in which arms of the unmanned aerial vehicle illustrated in FIG. 5 are extended.

FIG. 5 is a side view for illustrating an unmanned aerial vehicle according to a second embodiment of the present invention. FIG. 6 is a side view for illustrating a state in which arms of the unmanned aerial vehicle illustrated in FIG. 5 are extended.

A plurality of vertical members 214 are each held by a corresponding one of first arms 220A. The first arms 220A extend in the horizontal direction and are extendable and contractible. A first actuator 222A is configured to extend and contract the first arms 220A. The plurality of vertical members 214 can be changed so that a maximum inscribed rectangle thereamong is formed into a similar shape or a non-similar shape.

A plurality of rotary wings 210 are each held by a corresponding one of second arms 220B. The second arms 220B extend in the horizontal direction and are extendable and contractible. A second actuator 222B is configured to extend and contract the second arms 220B. The second group of arms 220B each vertically overlap with a corresponding one of the first group of arms 220A and extend in the same direction.

The plurality of rotary wings 210 are arranged on an outer side of a shape of the package carrier 212 (vertical members 214) by a distance $D_A$, $D_B$. With this, the downward airstream of the rotary wings 210 is prevented from hitting the package 216. A size of the distance $D_A$, $D_B$ is proportional to a size (width $W_A$, $W_B$) of the shape of the package carrier 212. For example, when the width $W_B$ of the large package 216 illustrated in FIG. 6 is n times larger than the width $W_A$ of the small package 216 illustrated in FIG. 5, the distance $D_B$ may be n times larger than the distance $D_A$. With regard to other contents, the contents described in the first embodiment are applied.

Third Embodiment

Figure 7:
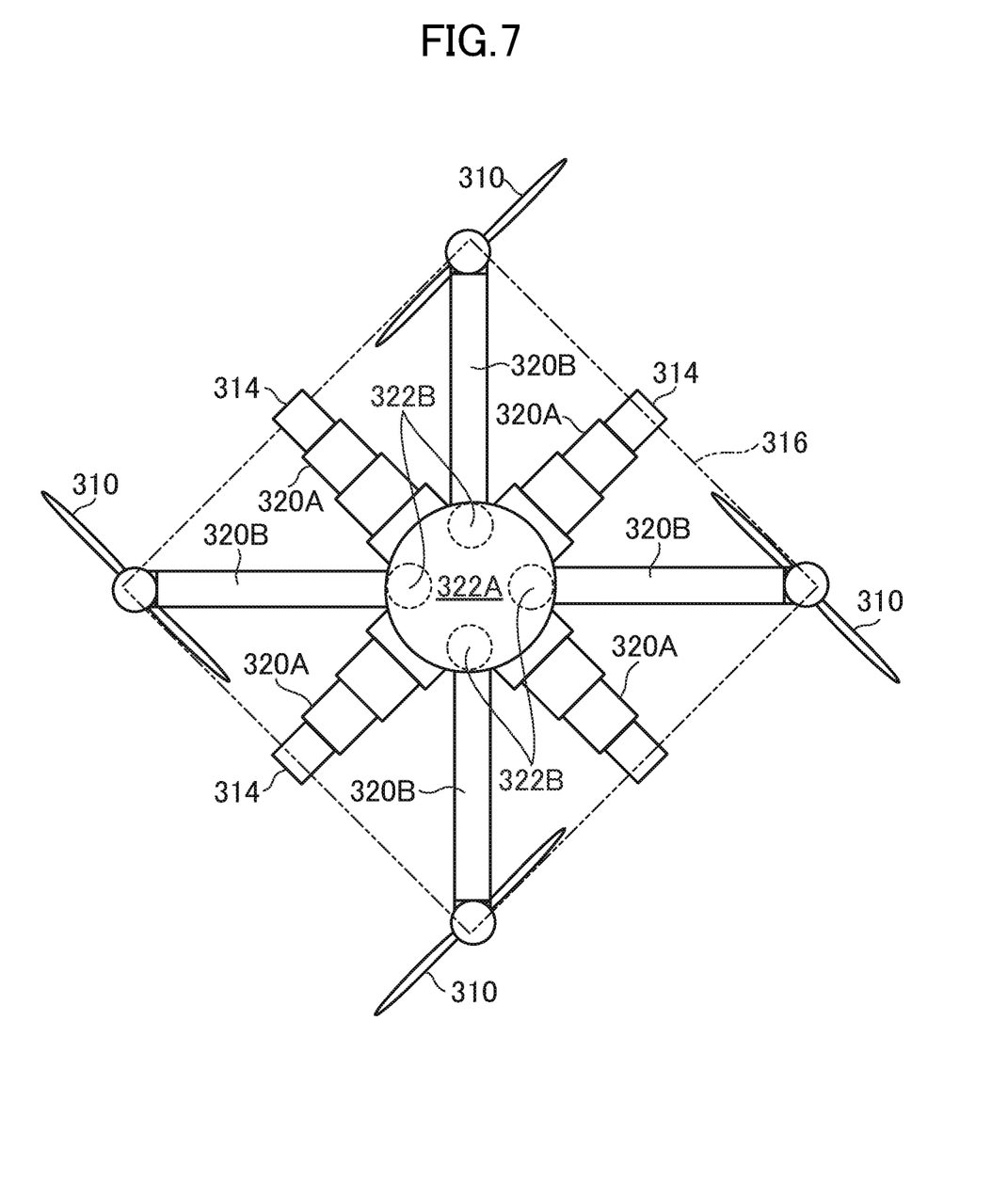
FIG. 7 is a plan view for illustrating an unmanned aerial vehicle according to a third embodiment of the present invention.

FIG. 7 is a plan view for illustrating an unmanned aerial vehicle according to a third embodiment of the present invention. A plurality of vertical members 314 are each held by a corresponding one of first arms 320A. The first arms 320A extend in the horizontal direction and are extendable and contractible. The first arms 320A are moved by a first actuator 322A. The first actuator 322A is configured to extend and contract the first arms 320A. The plurality of vertical members 314 can be changed so that a maximum inscribed rectangle thereamong is formed into a similar shape or anon-similar shape. A package 316A illustrated in FIG. 7 has a square shape in plan view.

A plurality of rotary wings 310 are each held by a corresponding one of second arms 320B. The second arms 320B extend in directions different from those of the first arms 320A. The second arms 320B are moved by a second actuator 322B. The second actuator 322B is configured to swing each of the second group of arms 320B at least at one position. The second actuator 322B is configured to swing each of the second group of arms 320B in a horizontal direction.

Figure 8:
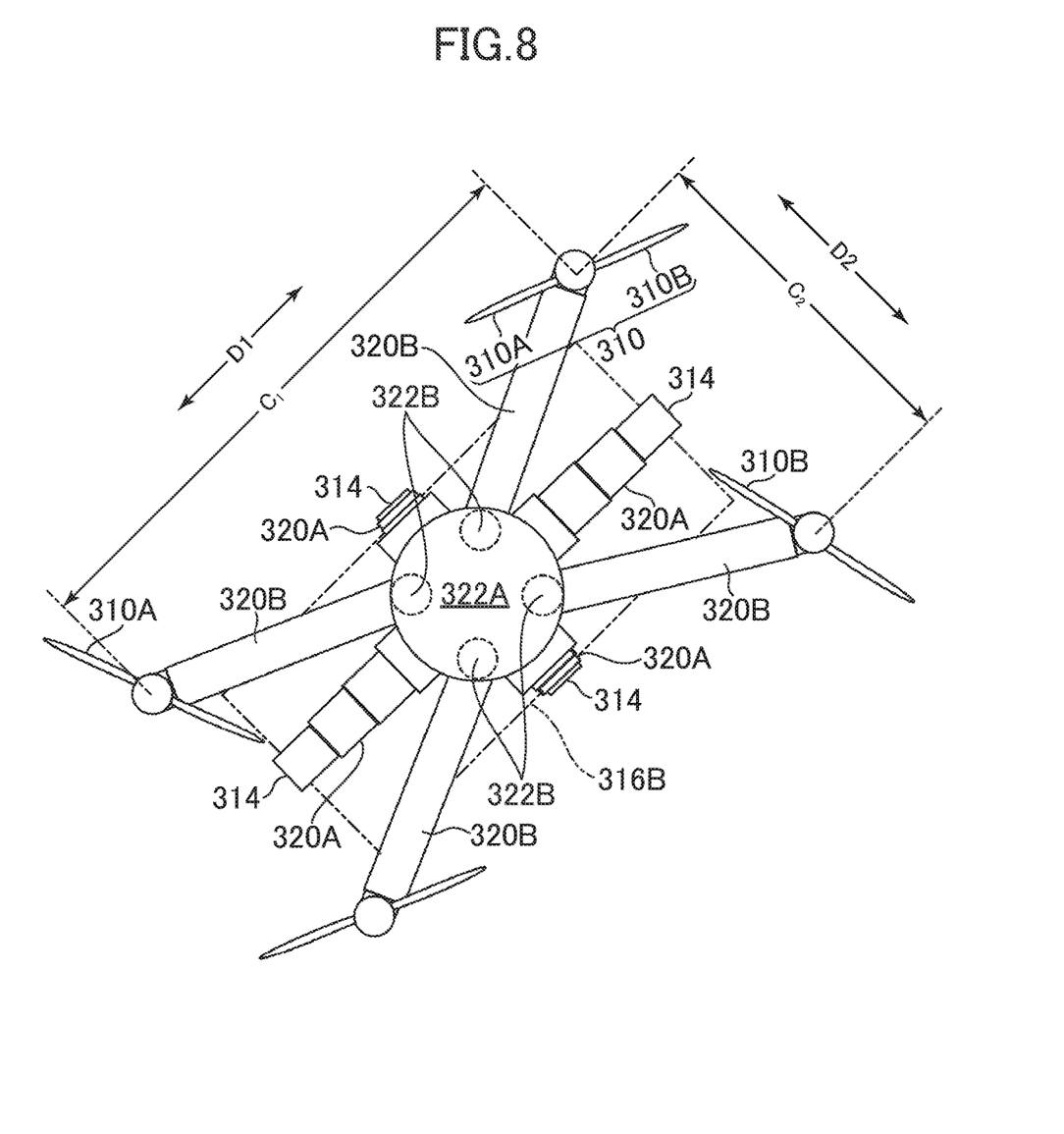
FIG. 8 is a plan view for illustrating a state in which arms of the unmanned aerial vehicle illustrated in FIG. 7 are extended and contracted.

FIG. 8 is a plan view for illustrating a state in which the arms of the unmanned aerial vehicle illustrated in FIG. 7 are extended and contracted. The plurality of rotary wings 310 include a first pair of rotary wings 310A which are adjacent to each other along a first direction D1. The plurality of rotary wings 310 include a second pair of rotary wings 310B which are adjacent to each other along a second direction D2 orthogonal to the first direction D1. When a maximum inscribed rectangle among the plurality of vertical members 314 is formed into a rectangle elongated in the first direction D1, a clearance $C_1$ of the first pair of rotary wings 310A is set larger than a clearance $C_2$ of the second pair of rotary wings 310B. A package 316B illustrated in FIG. 8 has a rectangular shape in plan view. With regard to other contents, the contents described in the first and second embodiments are applied.

Fourth Embodiment

Figure 9:
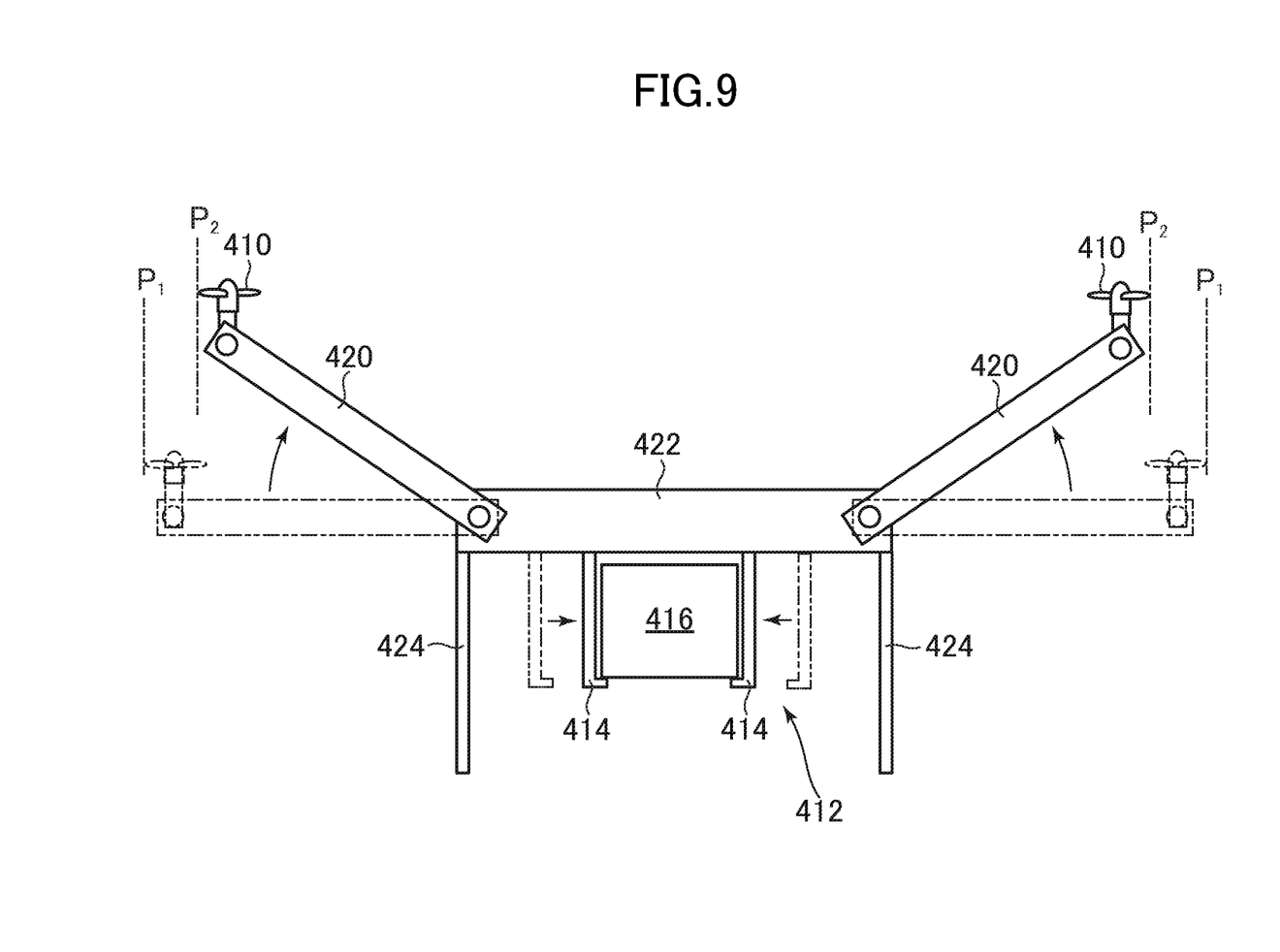
FIG. 9 is a side view for illustrating an unmanned aerial vehicle according to a fourth embodiment of the present invention.

FIG. 9 is a side view for illustrating an unmanned aerial vehicle according to a fourth embodiment of the present invention. The unmanned aerial vehicle includes landing gears 424, which are configured to support a vehicle body, and a package carrier 412. The package carrier 412 includes a plurality of vertical members 414. The plurality of vertical members 414 surround the package 416 in the horizontal direction to prevent falling of the package 416. The plurality of vertical members 414 are changeable in relative positions.

The unmanned aerial vehicle includes a plurality of rotary wings 410. The plurality of rotary wings 410 are each held by a corresponding one of a plurality of arms 420. The plurality of arms 420 are moved by an actuator 422. The actuator 422 is configured to swing each of the arms 420 in a perpendicular direction. The swing of the arms 420 in the perpendicular direction causes the rotary wings 410 to change in the horizontal direction from a first position $P_1$ to a second position $P_2$. That is, the plurality of rotary wings 410 are changeable in relative positions in the horizontal direction.

For example, at the first position $P_1$, the plurality of rotary wings 410 are most apart from each other, and the plurality of vertical members 414 are most apart from each other so that the package carrier 412 becomes largest. At the second position $P_2$, the plurality of rotary wings 410 are close to each other, and the plurality of vertical members 414 are close to each other so that the package carrier 412 becomes smaller. With regard to the rotary wings 410, rotation shafts thereof are moved in parallel by a link mechanism (not shown) even when the arms 420 swing. With regard to other contents, the contents described in the first to third embodiments are applied.

The present invention is not limited to the embodiment described above, and various modifications may be made thereto. For example, the structure described in the embodiment may be replaced by substantially the same structure, a structure having the same action and effect, and a structure which may achieve the same object.

The invention claimed is:

1. An aerial vehicle, comprising:
   a package carrier including a plurality of vertical members, the plurality of vertical members being changeable in relative positions in a horizontal direction and surrounding a package in the horizontal direction to prevent falling of the package;
   a plurality of rotary wings which are changeable in relative positions in the horizontal direction;
   an actuator configured to change the relative positions of the plurality of vertical members and the relative positions of the plurality of rotary wings; and
   a plurality of arms moveable by the actuator, wherein the relative positions of the plurality of vertical members and the relative positions of the plurality of rotary wings are changeable, wherein the package carrier is changed in shape in the horizontal direction in accordance with the relative positions of the plurality of vertical members, and wherein the change in the relative positions of the plurality of rotary wings is in conjunction with the shape of the package carrier, wherein each of the plurality of vertical members is held by a corresponding one of the plurality of arms, and wherein each of the plurality of rotary wings is held by a corresponding one of the plurality of arms.

2. The aerial vehicle according to claim 1, wherein each of the plurality of arms is configured to hold both at least a corresponding one of the plurality of vertical members and at least a corresponding one of the plurality of rotary wings.

3. The aerial vehicle according to claim 2, wherein the plurality of arms extend in the horizontal direction and are extendable and contractible, and wherein the actuator is configured to extend and contract the plurality of arms.

4. The aerial vehicle according to claim 1, wherein the plurality of arms include:
    a first group of arms configured to hold the plurality of vertical members; and
    a second group of arms configured to hold the plurality of rotary wings, and wherein the actuator includes:
    a first actuator configured to move the first group of arms; and
    a second actuator configured to move the second group of arms.

5. The aerial vehicle according to claim 4, wherein the second group of arms each vertically overlap with a corresponding one of the first group of arms and extend in the same direction.

6. The aerial vehicle according to claim 4, wherein the second group of arms extend in directions different from those of the first group of arms.

7. The aerial vehicle according to claim 4, wherein the plurality of vertical members are changeable so that a maximum inscribed rectangle thereamong is formed into a similar shape or a non-similar shape.

8. The aerial vehicle according to claim 7, wherein the plurality of rotary wings include:
    a first pair of rotary wings which are adjacent to each other along a first direction; and
    a second pair of rotary wings which are adjacent to each other along a second direction orthogonal to the first direction, wherein, when the inscribed rectangle is formed into an elongated rectangle in the first direction, and a clearance of the first pair of rotary wings is set larger than a clearance of the second pair of rotary wings.

9. The aerial vehicle according to claim 4, wherein a change amount of the relative positions of the plurality of rotary wings is proportional to a change amount of the relative positions of the plurality of vertical members.

10. The aerial vehicle according to claim 4, wherein the plurality of rotary wings are arranged on an outer side from the shape of the package carrier by a distance, and wherein a size of the distance is proportional to a size of the shape of the package carrier.

11. The aerial vehicle according to claim 4, wherein the first group of arms extend in the horizontal direction and are extendable and contractible, and wherein the first actuator is configured to extend and contract the first group of arms.

12. The aerial vehicle according to claim 4, wherein the second group of arms extend in the horizontal direction and are extendable and contractible, and wherein the second actuator is configured to extend and contract the second group of arms.

13. The aerial vehicle according to claim 4, wherein the second actuator is configured to swing each of the second group of arms at least at one position.

14. The aerial vehicle according to claim 13, wherein the second actuator is configured to swing each of the second group of arms in a horizontal direction.

15. The aerial vehicle according to claim 13, wherein the second actuator is configured to swing each of the second group of arms in a perpendicular direction.

* * * * *